Oct. 15, 1946.  C. T. TORRESEN  2,409,323
AIRCRAFT POWER PLANT ARRANGEMENT
Filed Dec. 12, 1940  2 Sheets-Sheet 1
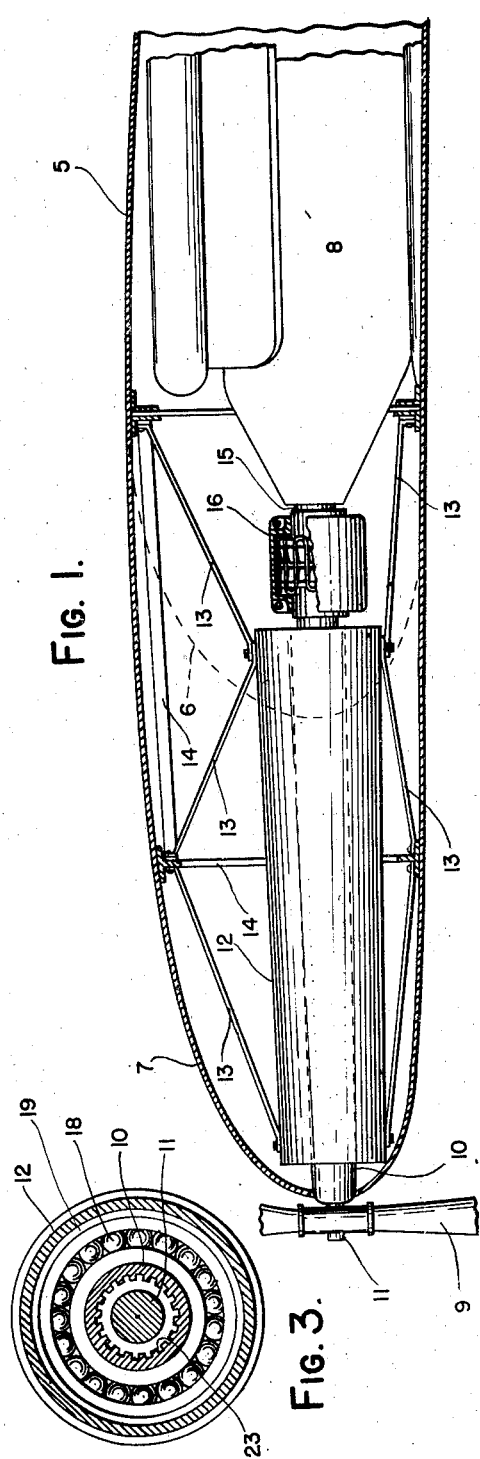
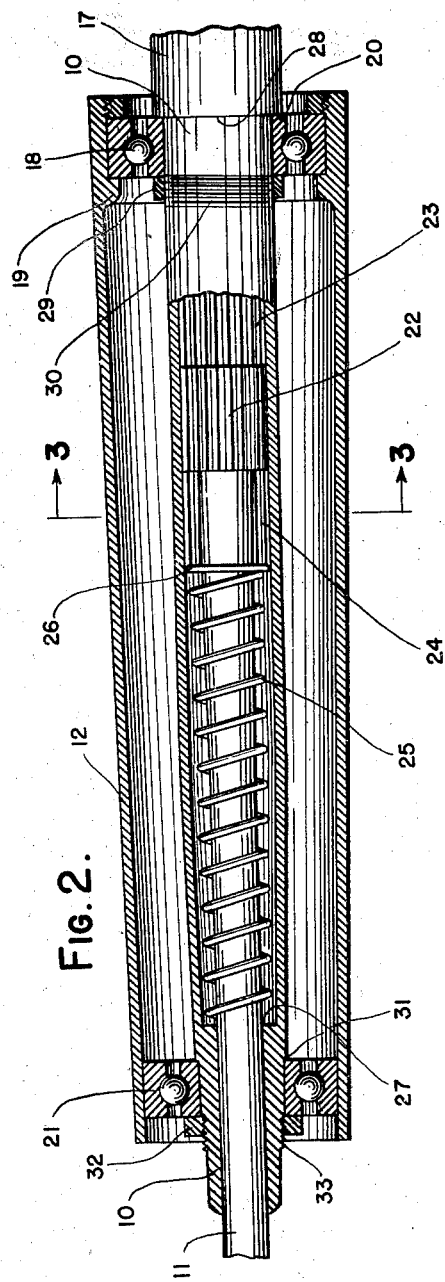
CAREL T. TORRESEN.
INVENTOR.
BY *James M. Clark*
HIS PATENT ATTORNEY.

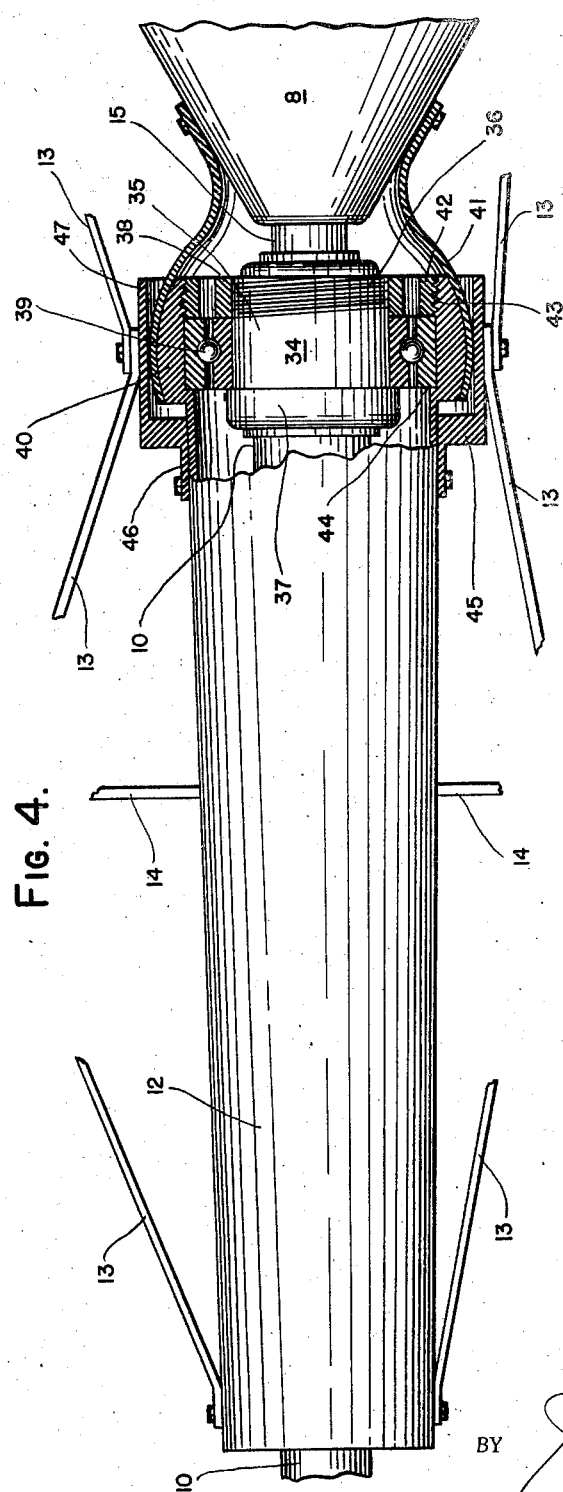

Patented Oct. 15, 1946

2,409,323

UNITED STATES PATENT OFFICE 2,409,323

AIRCRAFT POWER PLANT ARRANGEMENT

Carel T. Torresen, Santa Monica, Calif., assignor to North American Aviation, Inc., Inglewood, Calif., a corporation of Delaware Application December 12, 1940, Serial No. 369,787

4 Claims. (Cl. 64—1)

This invention relates to aircraft power plant arrangements, and more particularly to improvements in the power transmission mechanism and its support.

In the disposition of power plants at the leading edges of wings it has been found desirable to support the motor within the wing in the general region of its neutral axis and its maximum thickness, and to position the tractor propeller some distance forward of the leading edge for optimum propulsive efficiency. Such installations permit of power plant nacelles of smaller dimensions and considerable reduction in drag, but have presented a number of problems in providing an adequate structural support for the propeller and propeller shaft due to the length of the latter.

The present invention is directed to improvements in such extended propeller shafts or outriggers and their bearings and supporting structures. It briefly contemplates the provision of a two-part telescoping propeller shaft flexibly coupled to the motor and journalled within a radius tube such that bending of the shaft is prevented and both axial and torsional shocks are effectively dampened.

It is accordingly an object of the present invention to provide an improved power plant arrangement for the wings and bodies of aircraft in which the propeller is carried on an extended shaft or outrigger at some distance forward of the engine or motor. It is also an object of the present invention to provide an improved propeller outrigger support which includes a radius tube structure permitting of reasonable radial gyrations of the propeller as may be caused by the flexure of the supporting structure without introducing concurrent bending of the propeller shaft. A further object of the present invention resides in the provision of an extended outrigger or propeller shaft comprising two co-axial and resiliently opposed telescopic elements which damp out to great extents transmission of sudden shocks from the propeller to the motor, and vice versa, as are met with in cavitation of the propeller, or on sudden bursts of power, engine vibration, in climbing attitudes of the aircraft and from other causes.

Other objects and advantages of the present invention will occur to those skilled in the art after a reading of the following specifications and the accompanying drawings forming a part hereof, in which:

Fig. 1 shows a power plant arrangement of my invention installed in an aircraft wing;

Fig. 2 shows a detailed cross-section of the radius tube and the composite propeller shaft of the present invention;

Fig. 3 shows a cross-section of the propeller shaft and the co-axial radius tube taken along the lines 3—3 of Fig. 2; and Fig. 4 shows a modification of my invention in which the radius tube is extended aft toward the engine to provide a bearing and support in the region of the flexible coupling.

Referring now to Fig. 1, the numeral 5 indicates an aircraft wing having a leading edge 6 and a forwardly extending nacelle portion 7. An engine 8 is suitably supported within the wing 5 in the region of its neutral axis or maximum camber for driving the tractor propeller 9. An extended hollow propeller shaft 10 has co-axially disposed therein the solid propeller shaft 11 on the forward end of which is suitably mounted the propeller 9. The hollow propeller shaft 10 is journalled for rotation within the relatively fixed radius tube 12 which is supported from the structural framework of the wing 5 and the nacelle 7 by means of the structural brace members 13 and 14. The radius tube 12 is preferably frusto-conical in shape, being tapered toward the outboard or propeller end and is of a thickness and material which permits of reasonable flexural distortion sufficient to permit limited radial gyrations of the propeller and to allow of its following the flexure or distortion of the wing 5 and nacelle 7 as is normally produced in the usual wing constructions during certain conditions of the power plant and flight attitudes of the airplane.

The crankshaft 15 of the engine 8 is suitably keyed to the inner half of the flexible coupling 16, the outer half of which is likewise keyed to the inboard end 17 of the outer hollow propeller shaft 10. The flexible coupling 16 is preferably of the type which permits both angular and parallel misalignments of the connected shafts and which effectively damps and absorbs shocks transmitted both radially and axially. The hollow propeller element 10 is journalled at the inboard end within the radius tube 12 by the antifriction or ball thrust bearing 18, the outer race of which is suitably fixed with respect to the tube by the shouldered portion 19 and the threaded retainer ring 42. The inner race 20 of the bearing 18 is fixedly held against the shoulder 28 between the enlarged portion 17 and the hollow shaft 10 by means of the locking ring 29 suitably threaded to the shaft 10 by the threads 30. The forward end of the hollow shaft 10 is suitably journalled within the tube 12 by the slip bearing 21 which is fixedly held against the shoulder 31 on the shaft 10 by the threaded retainer ring 32 engaging the threads 33. The outer race of the bearing 21 is, however, slidingly fitted within the radius tube 12 such that flexing of the latter permits slight relative movement in axial directions between the bearing and the tube.

The outer hollow element 10 of the two-element propeller shaft is tapered toward the forward or propeller end at which its wall portion is relatively thick to provide a tapered bearing for the solid internal propeller shaft 11. The rearward portion of the element 10 has a wall of reduced thickness which is internally provided with splines 23 engageable by the splined portion 22 of the internal shaft 11. This permits of relative axial movement between the elements 10 and 11 but due to the engagement of the splined surfaces all rotational movement imparted to the outer element 10 through the motor drive is transmitted directly through the splines to the internal shaft 11. The latter also tapers from its inner or splined end toward its forward terminal upon which the propeller is mounted and there is co-axially disposed upon the shaft 11 and internally of the shaft 10 a compression spring 25 which bears against the collar 26 which is suitably pinned or fastened to the shaft 11 and at its forward end the spring abuts against the shoulder 27 provided on the inside of the outer element 10.

In operation, the propeller outrigger support shown in Figs. 1 and 2 provides a power plant arrangement in which rotation of the propeller is accomplished by the transmission structure through a portion of the aircraft which is subject to bending, vibration and deflection without causing bending stresses to be induced within the propeller shaft itself. The flexible coupling 16 resiliently takes up any misalignments, whether angular or parallel, between the engine drive shaft 15 and the propeller shaft 10. Also relative distortion or displacement between the wing and nacelle structures will be followed by the radius tube 12 with which the composite propeller shaft is permitted to move in unison as a result of the flexible coupling 16 by which it is coupled to the engine drive shaft 15 and also by the slip bearing 21. The resilient means in the form of the spring 25 which is interposed between the outer shaft 10 and the inner shaft 11 permits the propeller thrust to be resiliently transmitted to the aircraft structure while at the same time providing a positive propeller drive through the splined elements 22 and 23. The spring-loaded propeller shaft also tends to overcome cavitation on sudden bursts of power of the engine 8 or as are frequently met with in climbing attitudes of the aircraft. The flexible coupling 16 and the spring-loaded splined coupling of the two shaft elements 10 and 11 also tend to materially dampen out engine vibrations which are ordinarily transmitted into the usual extended propeller shafts.

It will also be noted that in Fig. 2 the propeller thrust is transmitted in an axial direction through the central shaft 11 and through the collar 26 which is fixed thereto and by the spring 25 bearing against the shoulder 27 to the outer shaft 10. Both shafts are under tension in the operating condition of the tractor propeller 9 and the thrust is transmitted by the shoulder 28 of the inboard end against the inner race of the thrust bearing 18 which in turn transmits the thrust to the shoulder 19 of the radius tube and from there into the wing and nacelle supporting structure by the braces 13 and 14. As the thrust increases and the spring 25 is compressed the splined portion 22 telescopes axially within the splines 23 and moves into the space 24.

In the modification shown in Fig. 4 the radius tube 12 has been extended rearwardly to enclose the flexible coupling and to provide the rear or thrust bearing in the region of its center, replacing the bearing 18 in the modification shown in Fig. 2. The forwardly located slip bearing 21, while not shown, is of course, retained in this modification in the same relative location as shown in Fig. 2. A flexible coupling 34 of the same type, and having the general properties of the above coupling 16, serves to couple the engine shaft 15 to the propeller shaft 10. Its outer element comprises a sleeve portion 35 suitably threaded on one end as at 36 and provided with a recessed or shouldered portion 37 at its forward end. The retainer ring 38 engages the threads 36 and serves to lock the inner race of the ball thrust bearing 39 to the outer element of the coupling and to transmit thrust exerted by the propeller upon the shaft 10 to the thrust bearing 39. The adjacent end of the radius tube 12 is provided with an offset portion 40 forming a shoulder 44 against which the outer race of the thrust bearing 39 is retained by the threaded ring 42 engaging the threads 43. The outer surface of the offset portion 40 is part-spherical in shape and bears against a similarly shaped socket element 41 which is suitably supported from the crankcase of the engine 8, and forms a ball and socket joint 40—41 permitting slight angular movements of the outrigger assembly about the center of the flexible coupling (which coincides with the center of the spherical surfaces), with respect to the axis of the engine crankshaft 15.

An annular shaped cover 45 is provided with an inner flange 46 which is attached to the wall of the radius tube 12 and is formed with a transverse outwardly extending portion 45 and a cylindrical portion 47 which is suitably supported by the braces 13 from the aircraft structure. This modification permits slight angular deflections of the outrigger assembly with respect to the axis of the engine drive shaft, due to radial gyrations of the propeller and deflections in the aircraft structure. This flexure of the supporting structure is frequently caused by radial gyrations of the propeller during flight conditions and due to the provision for this angular movement of the outrigger assembly the coincidence of the centers of the coupling 34, the bearing 39 and the ball and socket 40—41, and the fact that the bearings 21 and 39 are supported within the radius tube 12, no bending is induced into the propeller shafts. It is also to be noted that the hollow shaft 10 is also at all times journalled and supported within the radius tube 12 by means of the slip bearing 21 which is permitted to float slightly within relatively small limits in an axial direction as such relative movements may be induced by flexure of the supporting structure or of the radius tube, or due to expansion.

The arrangements disclosed provide extended propeller shaft drives of a type in which failure of the shaft due to forces set up by bending and vibrations of the engine and the wing structure are materially reduced and such vibrations are effectively damped out by the resilient torsional and axial means before they attain appreciable magnitude. The spring in the flexible coupling serves to damp out torsional shocks and the spring in the double propeller shaft, between the abutments 26 and 31, damps out the major axial shocks while the latter is freed of bending. While the present invention has been shown applied to power plants mounted at the leading edge of the wing, the invention is equally applicable of use within the fuselage or body of an aircraft. It is also applicable for use with pusher propellers in which the outrigger assembly extends through the trailing edge of the wing, in which case the spring or hydraulic means would be disposed such that axial thrust forces between the two shaft elements would be properly absorbed. Other advantageous modifications both in general arrangement and detail design which may become apparent to those skilled in the art are intended to come within the scope and spirit of the present invention as more clearly defined by the appended claims.

I claim:

1. A drive shaft assembly for a propeller comprising a propeller-carrying shaft having an externally splined portion, a second hollow shaft co-axially disposed about said first shaft and having internal splines therein engaging the said splined portion on said propeller-carrying shaft, the said first shaft being supported for relative axial movement within said second shaft, an elongated tubular member supported by adjacent structure co-axially disposed with respect to said co-axial shafts, bearing means supported internally of said elongated member adjacent each of its ends adapted for the journalling of said second shaft therewithin, opposed shouldered portions carried by each said shaft and resilient means interposed between said shouldered portions opposing relative axial movements thereof for the resilient transmission of propeller thrust from said first to said second shaft and the relief of said tubular member of said propeller thrust.

2. A drive shaft assembly for a propeller comprising a propeller-carrying shaft having a splined portion at its inboard end, a hollow shaft co-axially surrounding said first shaft and internally splined to engage said first splined portion, opposed abutments carried by each said shaft, resilient means interposed between said abutments on said shafts to oppose relative axial movements therebetween initiated by propeller thrust while permitting rotational engagement through said splined portions, a power drive source, means for coupling the inboard end of said hollow shaft to said power drive source, an embracing structure co-extensive with the telescoped portions of said shafts, said structure having a thrust bearing at its inboard end adjacent said power drive coupling and a slip bearing adjacent its outboard end adjacent said propeller for the journalling of said hollow shaft such that radial gyrations of said propeller shaft are transmitted to said embracing structure through said slip bearing to avoid bending of said propeller shaft and axial thrust of said propeller is transmitted through said resilient means, to said hollow shaft and the inboard portion of said embracing structure by said thrust bearing, relieving the outboard portion of said embracing structure of said propeller thrust.

3. An arrangement for supporting a propeller shaft in a fuselage, said arrangement comprising an inner propeller-carrying shaft provided with external splines, an outer shaft internally bored to co-axially enclose a portion of said first shaft, said outer shaft having internal splines for telescopic torque transmitting engagement with said external splines, shouldered portions carried by each said shaft, means co-axially interposed between said inner and outer shafts adapted to resiliently oppose said telescopic movement initiated by propeller thrust, and an embracing member supported from adjacent structure having a thrust bearing at its inboard portion and a slip bearing at its outboard portion for the journalling of said outer shaft, radial gyrations of said propeller shaft being transmitted to said embracing member through said slip bearing at its outboard portion avoiding bending of said propeller shaft and axial thrust of said propeller being transmitted through said resilient means and said hollow shaft to said thrust bearing at the inboard portion of said embracing member to relieve its outboard portion of said propeller thrust.

4. A drive shaft assembly for a propeller comprising an axially extending supporting member, a hollow drive shaft co-axially journalled within said supporting member adjacent its outboard and inboard ends, said inboard journal preventing relative axial movement between said hollow shaft and said supporting member, a propeller-carrying shaft co-axially disposed within said first shaft, splined portions internally and externally formed on said first and second shafts, respectively, a guide journal formed adjacent the outboard end of said hollow shaft for slidingly receiving the said propeller-carrying shaft to permit relative telescopic movement therethrough, opposed shouldered portions carried by each shaft and resilient means interposed between said first and second shafts and their respective shouldered portions arranged for resiliently opposing said telescopic movements initiated by variations in axial propeller thrust, radial gyrations of said propeller-carrying shaft adapted to impart flexure through said guide and outboard journals to said supporting member, and said relative axial movements between said hollow shaft and said supporting member adapted to prevent bending of said propeller-carrying shaft.

CAREL T. TORRESEN.